United States Patent [19]

Lapidous

[11] Patent Number: 5,793,379
[45] Date of Patent: Aug. 11, 1998

[54] METHOD AND APPARATUS FOR SCALING IMAGES HAVING A PLURALITY OF SCAN LINES OF PIXEL DATA

[75] Inventor: Eugene Lapidous, Santa Clara, Calif.

[73] Assignee: Nvidia Corporation, Sunnyvale, Calif.

[21] Appl. No.: 921,425

[22] Filed: Aug. 29, 1997

Related U.S. Application Data

[63] Continuation of Ser. No. 415,545, Apr. 30, 1995, abandoned.

[51] Int. Cl.$^6$ .................................................. G06T 3/40
[52] U.S. Cl. .......................... 345/439; 345/428; 382/298
[58] Field of Search ................................. 345/433, 434, 345/435, 439, 443, 428, 138; 382/298, 299, 300; 348/441, 443, 445

[56] References Cited

U.S. PATENT DOCUMENTS

| | | | |
|---|---|---|---|
| 5,237,432 | 8/1993 | Calarco et al. | 358/451 |
| 5,297,217 | 3/1994 | Hamilton et al. | 382/41 |
| 5,327,257 | 7/1994 | Hrytzak et al. | 358/447 |
| 5,329,614 | 7/1994 | Kidd et al. | 345/439 |
| 5,335,296 | 8/1994 | Larkin et al. | 382/298 |
| 5,500,744 | 3/1996 | Sabath | 358/456 |
| 5,517,584 | 5/1996 | Jennings | 382/276 |
| 5,537,224 | 7/1996 | Suzuoki et al. | 358/462 |
| 5,694,149 | 12/1997 | Cahill, III | 345/127 |

OTHER PUBLICATIONS

G. Wolberg, "Digital Image Warping," IEEE Computer Society Press, 1992, pp. 159–160.

Tabata et al., "High Speed Image Scaling For Integrated Document Management," 2nd ACM–SIGOA Conf. on Office Info. Jun. 1984.

*Primary Examiner*—Joseph H. Feild
*Assistant Examiner*—Stephen Hong
*Attorney, Agent, or Firm*—Stephen L. King

[57] ABSTRACT

A method of processing a digital input image having a plurality of scan lines of pixel data into an interpolated digital output image by interpolating the pixel data in each scan line of the digital input image and replicating the pixel data in the slow scan direction to provide a plurality of scan lines interpolated in the fast scan direction, calculating slow scan direction interpolation coefficients for scan lines to be interpolated in the interpolated output image, storing the interpolated scan lines using the storage typically used for the display image, interpolating selected scan lines which have been stored using selected existing scan lines to produce scan lines interpolated in the slow scan direction of the interpolated output image, and writing scan lines interpolated in the slow scan direction in place of scan lines selected for interpolation in the output image.

21 Claims, 5 Drawing Sheets

| Weight | | |
|---|---|---|
| 1.0 | Scanline 1 | |
| 0.75 | A1 | |
| 0.5 | B1 | |
| 0.25 | C1 | |
| 1.0 | Scanline 2 | |
| 0.75 | A2 | |
| 0.5 | B2 | |
| 0.25 | C2 | |
| 1.0 | Scanline 3 | |
| 0.75 | A3 | |
| 0.5 | B3 | |
| 0.25 | C3 | |

| | Figure 3 | Figure 4 |
|---|---|---|
| Scanline 1 | SL1 | 0.5 SL1 + 0.5 SLB0 |
| A1 | 0.75 SLA1 + 0.25 SL2 | 0.75 SLA1 + 0.25 SLB0 |
| B1 | 0.5 SLB1 + 0.5 SL2 | SLB1 |
| C1 | 0.25 SLC1 + 0.75 SL2 | 0.75 SLC1 + 0.25 SLB2 |
| Scanline 2 | SL2 | 0.5 SL2 + 0.5 SLB1 |
| A2 | 0.75 SLA2 + 0.25 SL3 | 0.75 SLA2 + 0.25 SLB1 |
| B2 | 0.5 SLB2 + 0.5 SL3 | SLB2 |
| C2 | 0.25 SLC2 + 0.75 SL3 | 0.75 SLC2 + 0.25 SLB3 |
| Scanline 3 | SL3 | 0.5 SL3 + 0.5 SLB2 |
| A3 | 0.75 SLA3 + 0.25 SL4 | 0.75 SLA3 + 0.25 SLB2 |
| B3 | 0.5 SLB3 + 0.5 SL4 | SLB3 |
| C3 | 0.25 SLC3 + 0.75 SL4 | 0.75 SLC3 + 0.25 SLB4 |
| Scanline 4 | SL4 | 0.5 SL4 + 0.5 SLB3 |

Fig. 5

METHOD AND APPARATUS FOR SCALING IMAGES HAVING A PLURALITY OF SCAN LINES OF PIXEL DATA

This application is a continuation of application Ser. No. 08/415,545, filed Apr. 3, 1995, now abandoned.

BACKGROUND OF THE INVENTION

1. Field of the Invention

This invention relates to computer graphics circuitry, and more particularly, to methods and apparatus for scaling the output presented on a computer output display.

2. History of the Prior Art

A digital image may be created in a variety of ways including raster scanning a hardcopy document, using an image editor to create a line drawing, and using a video frame grabber to capture a frame of a video signal. The resulting digital image is characterized as binary or continuous tone as in a gray-scale or color images. Of particular importance to the present invention are binary images which are internally represented in a computer by bit-maps that may be optically perceived as pixels.

There has been much work in the field of image processing to efficiently transform an image by resampling. By resampling an image, a higher or lower resolution image can be made from an existing image. Sampling is the term used for the initial conversion of an analog image into a digital image, while resampling refers to a subsequent conversion from a first digital image to a second digital image. When an image is resampled, the image may also be rescaled in size by reduction or enlargement. For example, a user of a computer aided design (CAD) system who desires to focus in on a particular feature of a large engineering drawing may use a zoom-in operation to enlarge the selected feature. During the zooming operation, the image is resampled to provide an enlarged view of the area of interest.

The process of providing a resampled image usually involves drawing stripes of pixels (scan lines) in a first direction (for instance, from left to right horizontally) called the fast scan direction. Each subsequent stripe drawn in the fast scan direction is positioned relative to the previous stripe in a second direction (for instance, from top to bottom vertically) called the slow scan direction.

The simplest resampling technique which provides an enlarged view involves replicating (copying) each of the original source pixels some number of times in one or both of the fast and slow scan directions. However, such resampling produces blocks of identical pixels which, with sufficient contrast, often appear as visual blocks on the display. Another problem with this form of resampling to produce an enlarged view (called scaling) is that it may cause certain lines on the display to appear jagged even though they are not jagged in the original unscaled version.

Better results than by replication are produced when the output pixels are calculated by summing weighted values of more than one source pixel. The choice of which source pixels to include in the weighted sum can be made in various ways. Examples of source pixels used include the four nearest neighbors and the two nearest neighbors. The simplest and most cost effective example of this approach is linear interpolation in which the color of an output pixel is calculated as a weighted sum of the two nearest neighbor source pixels in the fast scan direction. Although more difficult, linear interpolation can also be performed in the vertical or slow scan direction only or in both scan directions.

Choosing the two nearest neighbors in the fast scan direction is particularly convenient. Because a central processing unit is computing pixels sequentially in the fast scan direction during the time of stripe (scan line) generation, the pixel values necessary to the interpolation are typically available in the central processing unit registers so that the central processing unit need only manipulate values of data at hand to accomplish the interpolation. Since the data are usually stored in the internal registers of the central processing unit, they do not require additional storage space.

Of particular importance to the present inventions are scaling operations that involve change of the image size in the slow scan direction. Interpolation of the image in the slow scan direction is a significantly more complex process than interpolation in the fast scan direction because the process requires operations on pixels that belong to different stripes and usually were first processed by the central processing unit during different periods of time. The processing of pixels in the slow scan direction usually requires pixel data from a previous scan line and a next scan line.

Specifically, one basic approach widely used in the art relies on storing an intermediate image within a random access memory and then operating on the individual bits of the such image. To produce high quality output, this approach relies on the fact that the result of bi-directional linear interpolation is equivalent to the result of the two subsequent interpolations in the fast and slow scan directions (George Wolberg: Digital Image Warping, p.159–160, IEEE Computer Society Press, 1992, Los Alamitos, Calif.). Therefore, a storage buffer can be used after interpolation in the fast scan direction as a source for interpolation in the slow scan direction.

This overall approach requires a sufficiently large memory which also provides relatively fast read-write random access. This memory, particularly when fabricated from currently available high speed random access memory (RAM) circuits, tends to be very expensive. Furthermore, even with such a large fast memory, image scaling is often performed through a software based process executing in a microprocessor and, as such, tends to be relatively slow in processing an entire image.

U.S. Pat. No. 5,297,217 describes a method to decrease the amount of storage space required for slow scan direction interpolation. The method involves partitioning of the image into small uniform regions called "tiles", each of which is then separately processed. Typically, a tile is significantly smaller than the entire image and requires a smaller amount of storage space. A problem with this method is that it cannot provide correct interpolation for pixels at the borders of the tiles that need data from neighboring tiles during processing resulting in artifacts such as blockiness along the borders of tiles. Furthermore, this approach does not decrease the number of computations required by a central processing unit.

The reduction of the load on the central processing unit during interpolation can be achieved by using highly specialized image co-processors such as the TMC2301 image resampling sequencer available from TRW LSI Products, or such as described by Tabata, et al., ("High-Speed Image Scaling for Integrated Document Management", 2nd ACM-SIGOA Conference on Office Information, Jun. 25–27, 1984). Such specialized circuitry tends to be very expensive and still requires large intermediate storage buffers or additional exchanges between the central processing unit and the display system. For instance, in the image scaling design of Tabata, each pixel is generated by interpolating between the four source pixels that surround the point being resampled; this requires the source pixels to be pre-stored or to be sent multiple times from the central processing unit to the display system. An additional disadvantage of this specialized circuitry for image scaling is a poor ability to generate images with adjustable contrast.

Interpolated images often look blurry, while images which are not interpolated but are formed of blocks of replicated pixels often exhibit relatively high contrast. It is often desirable to provide a means for adjusting the image contrast to select a compromise between artifacts of high contrast images and smooth but blurry images after interpolation. A method described in U.S. Pat. No. 5,327,257 describes a way to achieve this goal. The method calculates multiple sets of output pixels (one for a high-contrast image, another for a low-contrast image) and combines the images at the output stage with adjustable weights to produce a final image with adjustable contrast. This method requires additional circuitry to produce multiple outputs and needs intermediate storage space to use as a source for generation of these outputs.

Another disadvantage of known methods for image scaling is their inability to provide a flexible selection between the quality of interpolation (smoothness of transition between pixels) and the time which the process of interpolation requires. For some types of applications which involve synchronous streams of video data (such as frames of digitized video), the time available for drawing and interpolating each frame is limited to the period between two consecutive frames. As the scale factor of the image becomes larger (video is "zoomed up"), drawing and interpolation of each individual frame requires more and more time. It is often more important to maintain the frame rate (avoid stops and still frames in the video) than to produce high-quality interpolation for each frame. Therefore, it is desirable to have a scaling mechanism that allows the production of images of a different quality, where an image with a lower quality of interpolation requires less output time. It is also desirable to have a scaling mechanism that gradually increases the quality of the output image in time (as opposed to creating an output image piece-by-piece) so that the interruption of the scaling process results in a decrease of the image quality but not in the creation of an incomplete image.

SUMMARY OF THE INVENTION

It is an object of the present invention to provide an improved and inexpensive method of processing a digital input image into an interpolated digital output image which method does not requires additional storage space.

It is another object of the present invention to provide apparatus and an improved method of creating a continuum of interpolated output images which may range from relatively high contrast images to relatively low contrast images or may provide a range of images based on some other image parameters without respect to the time available for processing.

It is another object of the present invention to provide apparatus and an improved method of creating a continuum of interpolated output images ranging from images of low quality of interpolation that can be produced rapidly to images of high quality of interpolation that can be produced slowly so that the user has the ability to select relationship between quality of the image and output performance based on time constraints of the particular application.

It is a further object of the present invention to provide apparatus and a method of processing a digital input image into an interpolated digital output image which method can be interrupted by the user at some intermediate stage of processing with the only penalty of such interruption being a decrease in quality of otherwise complete output image.

These and other objects of the present invention are realized in a method and an arrangement for scaling in which scan lines are interpolated in one direction as they are generated by the central processing unit and sent to the frame buffer, intervening lines are replicated by the graphics control circuit to the required number and sent to the frame buffer, and selected scan lines existing in the frame buffer are replaced by new scan lines computed as a weighted sum of the scan lines to be replaced and other scan lines in the same frame buffer, the replacement beginning with those existing scan lines whose pixels have the lowest weight in the weighted sum and therefore having to undergo the greatest change during replacement, the replacement proceeding depending on the time available through existing scan lines having higher weights and therefore exhibiting lesser degrees of pixel change while in the frame buffer utilizing blending circuitry of the graphics control circuit. The method is readily adaptable to the selection by the user of the criteria by which scan lines are selected to be first interpolated and the algorithm by which interpolation is accomplished.

These and other objects and features of the invention will be better understood by reference to the detailed description which follows taken together with the drawings in which like elements are referred to by like designations throughout the several views.

BRIEF DESCRIPTION OF THE DRAWINGS

FIG. 5 is a diagram illustrating values used in computations of interpolated scan lines in accordance with the present invention.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
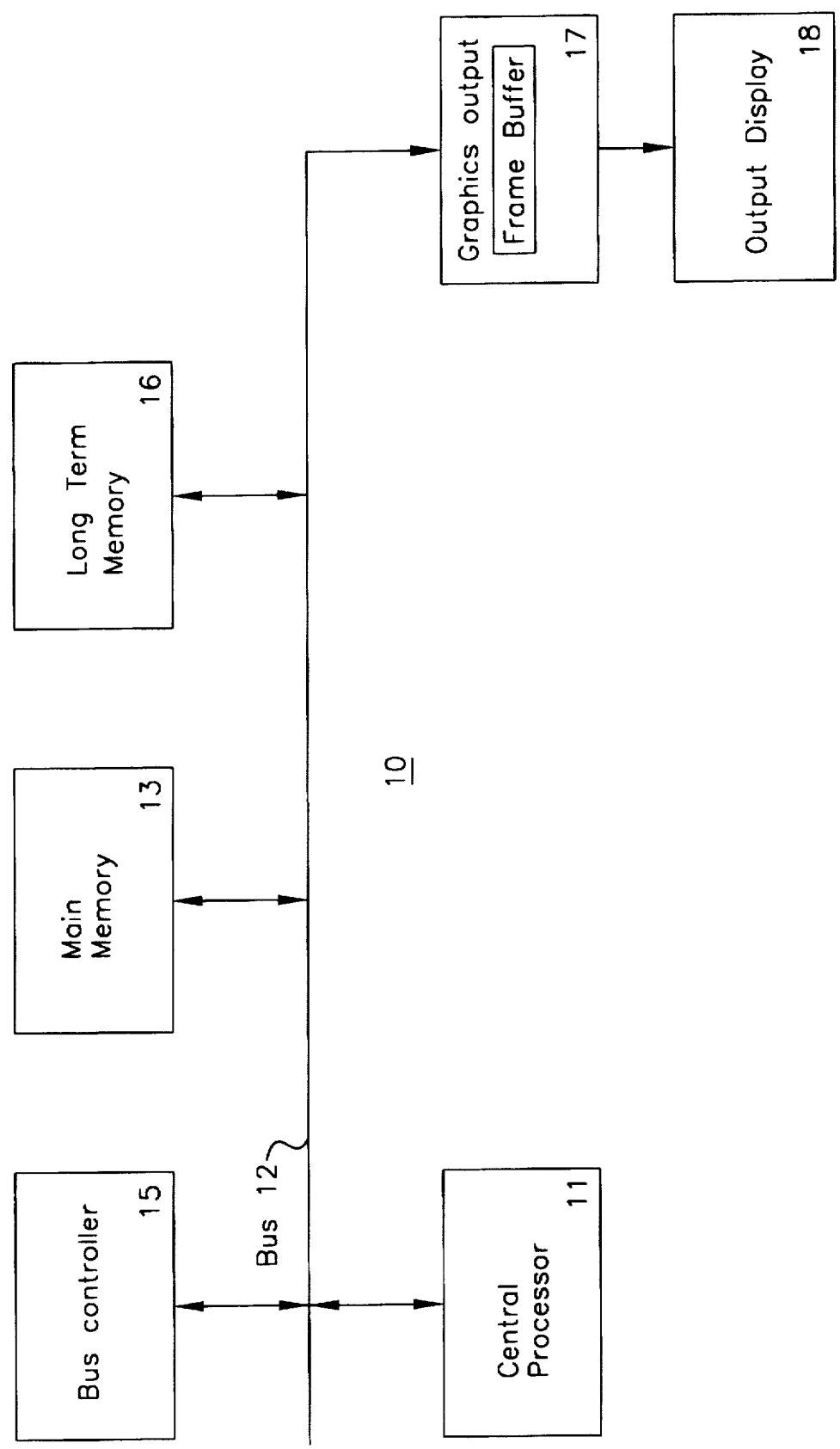
FIG. 1 is a block diagram of a computer system which may utilize the present invention.

Referring now to FIG. 1, there is illustrated a computer system 10. The system 10 includes a central processing unit 11 which executes the various instructions provided to control the operations of the computer system 10. The central processing unit 11 is joined to a bus 12 adapted to carry information to various components of the system 10. Joined to the bus 12 is main memory 13 which is typically constructed of dynamic random access memory arranged in a manner well known to those skilled in the prior art to store information during a period in which power is provided to the system 10. Also connected to the bus 12 are various peripheral components such as long term memory 16 and circuitry such as a graphics control circuit 17 which may include a frame buffer to which data may be written which is to be transferred to an output device such as a monitor 18 for display.

Figure 2:
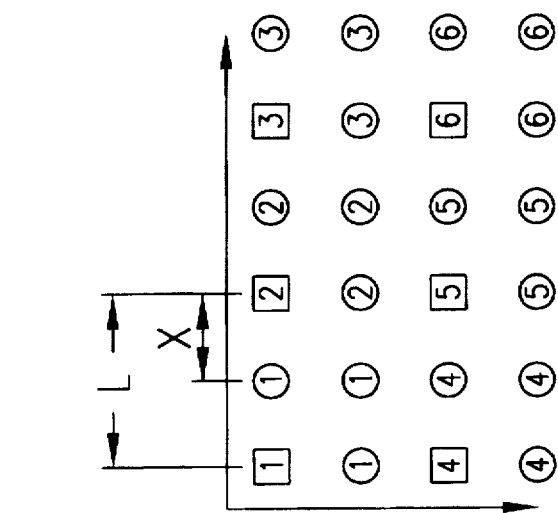
FIG. 2 is a diagram illustrating a prior art method of presenting scaled images on a computer output display.

As has been explained above, it is often necessary to scale pixel data from one format size to another format size on an output display of a computer or other digital system. An easy and rapid method to accomplish scaling is by first replicating (copying) each of the pixels in a scan line a sufficient number of times to produce individual scan lines of sufficient length and also replicating each original scan line which has been increased in length some number of times to provide additional scan lines between the original but lengthened scan lines. Such a process is illustrated in FIG. 2 in which original pixels (shown as rectangles) are first duplicated to form additional pixels (shown as circles) on scan lines which are twice the length of original scan lines. Then the pixels of each original scan line (the scan lines having rectangular pixels) are duplicated again and shown as circles placed between the original scan line and a next original scan line. This produces a display which is twice (in the illustration) the size of the original display in each direction. In a modification of this process, each pixel in a horizontal scan line is replicated in the vertical direction as it is written to the frame buffer so that an original scan line and a plurality of replicated scan lines are produced together.

Replication is certainly the least expensive way to accomplish scaling because the replication of pixels in a scan line may be easily and rapidly accomplished by the central processing unit using the values of adjacent pixels on a scan line as those pixels are transferred to a graphics control circuit. In this process, the central processing unit furnishes only the original number of scan lines which have been lengthened horizontally by replicating each pixel the desired number of times. Then these original scan lines are again replicated vertically by the graphics control circuitry. Many graphics control circuits contain replication hardware for replicating pixels so the replication of scan lines between the original lengthened scan lines may be accomplished easily and rapidly once the pixel data has been written to the frame buffer. However, in the modified process described above, each pixel of the original scan line is replicated vertically to produce additional scan lines as it is written to the frame buffer. If bilinear texture mapping which is based on a replication process (circuitry well known to those skilled in the art) is available as a part of the graphics output control circuitry, the source image to be scaled can be treated as a texture in order to produce replicated pixels in both the horizontal and vertical directions. This circuitry is utilized because it allows the replication process to be set to simply replicate each pixel a selected number of times in each of the horizontal and vertical directions. The texture mapping circuitry also allows the process to be accomplished while the central processing unit is writing to the frame buffer rather than requiring that the original scan lines first be placed in the frame buffer and then replicated in a separate step.

As has also been pointed out, the simple replication of pixels in both directions on an output display often produces blockiness and causes lines to appear jagged on the display. As FIG. 2 illustrates, all of the pixels in a block (those labeled with the number of the original pixel) are identical so the eye shifts from one large block of identical pixels to a next large block of identical pixels.

In order to provide a better picture, various interpolation processes may be applied rather than simply replicating each original pixel. Using these processes, the values of more than just one of the existing pixels adjacent a new pixel are utilized in generating each new pixel. To generalize, a new pixel is generated by calculating a weighted sum $$I = W0*D + W1*S1 + W2*S2 + \ldots + Wn*Sn \tag{1}$$

where I is a color component of a new pixel; D is a color component of an existing pixel that is to be replaced by the new pixel; S1 ... Sn are color components of one or more other input pixels adjacent the existing pixel; W0 is weight, or interpolation coefficient, of the existing pixel; and W1 ... Wn are weights or interpolation coefficients of one or more input pixels adjacent to the existing pixel that is to be replaced. The sum of all the weights in the equation above is equal to one. The interpolation coefficient, or weight, of the existing pixel (W0) represents its contribution to the new pixel that replaces it. A lower value of such contribution generally corresponds to a greater change which a pixel at a given location undergoes in interpolation.

A linear interpolation process which considers only adjacent pixels in a single direction appears to be the least expensive way to produce a decent scaled output display. To produce a new pixel, the position of the new pixel is compared with the closest position of pixels from the original image which the pixels would occupy in a contiguous coordinate space. In the case of a one dimensional linear interpolation, only two pixels are sampled to calculate color components of the interpolated pixel. One is an existing pixel which is to be replaced by a new pixel; this existing pixel belongs to a set of identical pixels created from a first pixel of the original image, a set such as that illustrated in FIG. 2. Another is a pixel that belongs to a set of identical pixels created from a second pixel of the original image. As is shown in FIG. 2, for a case of interpolation with a factor of two. L is a distance between positions that pixels from the original image would occupy in contiguous coordinate space; X is a distance between the position of an existing pixel to be replaced and the position of a pixel from the original image which is different from the pixel used to replicate the existing pixel to be replaced. In the case of linear one-dimensional interpolation, the weight of the existing pixel in the new pixel that replaces it is equal to the result of the division of X by L.

As will be seen, computing the value of a new pixel requires that the circuit or software process accomplishing the operation have both the value of the existing pixel to be replaced and the other input pixel in order to accomplish the operation. This is not a difficult operation for a central processing unit to accomplish in the fast scan direction while generating a scan line since the existing pixel to be replaced has the same value as the first pixel of the original scan line and other input pixel has the same value as the second pixel of the original scan line and is adjacent to the first pixel, so that both pixels are readily available without additional steps by the central processing unit.

However, in order to interpolate between pixels in vertically-adjacent scan lines (in the slow scan direction), some form of memory is necessary to hold the pixels of the first existing scan line which has been generated and placed in a frame buffer until the pixels of a second input scan line have been generated and are ready for processing with those of the first existing scan line in order to generate the new scan line which replaces first existing scan line. It will be recognized that this is very difficult for the central processing unit to accomplish without appreciably slowing the operation of sending scan lines of pixel data to the frame buffer for display. Slowing the sending of scan lines of pixel data to the frame buffer for display is one of the major faults which can occur in the generation of video (and other) information since it can cause the display to lose frames and present an amateurish appearing output. For this reason, the interpolation in a slow scan direction must be performed if at all by very expensive circuitry which is a part of the graphics control circuitry. One way in which the load on the central processing unit can be reduced during interpolation is by using highly specialized image co-processors such as the TMC2301 image resampling sequencer. Such specialized circuitry tends to be very expensive and still requires large intermediate storage buffers or additional exchange between the central processing unit and the display system.

The present invention may make use of such expensive interpolation hardware which is added to become a part of the graphics control circuit to interpolate in a slow scan direction but it does not require such circuitry. Rather, the present invention preferably utilizes resources already available and provides a new method for accomplishing the scaling of graphics images in the most inexpensive and rapid way possible under the circumstances without slowing the operation of the system and making it necessary to drop frames which would otherwise be displayed.

Figure 6:
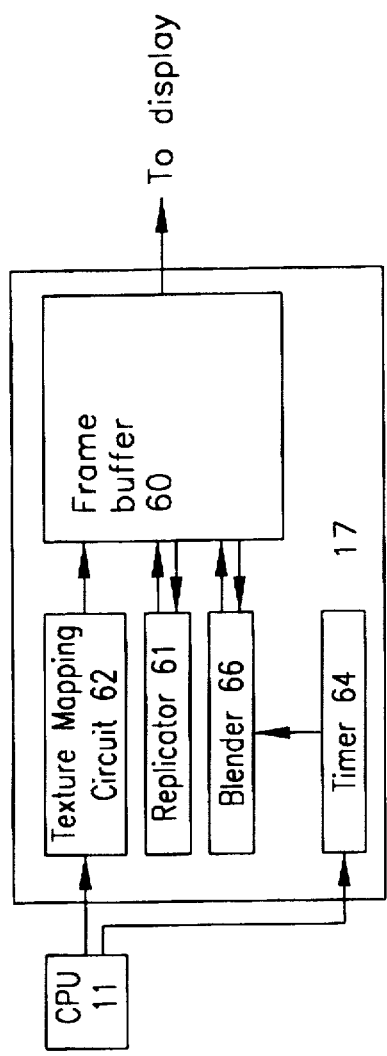
FIG. 6 is a block diagram illustrating an input/output device constructed in accordance with the present invention.

In order to accomplish scaling using the present invention (see FIGS. 6 and 7), the central processing unit 11 linearly interpolates the pixels of each scan line of pixels as often as required by the scaling factor while the pixels of the scan line are being written to the frame buffer. This requires only that the central processing unit 11 hold the value of the two adjacent original pixels being written to the frame buffer 60 in order to generate the new pixels between those original pixels using a looping function. After each scan line is transferred to the frame buffer 60, each pixel written is also replicated in the vertical or slow scan direction as often as is required by the scaling factor using the built-in replication hardware 61 of the graphics control circuitry 17. As has been pointed out above, many graphics control circuits contain replication hardware for replicating pixels so the replication of scan lines may be accomplished easily and rapidly once the pixel data has been written to the frame buffer. In another embodiment of the present invention, circuitry 62 normally utilized for forward texture mapping to produce replicated pixels in both the horizontal and vertical direction is utilized for the replication of scan lines in the slow scan direction. This circuitry 62 is utilized because it allows the replication process to be set to simply replicate each pixel a selected number of times in each of the horizontal and vertical directions. The texture mapping circuitry also allows the process to be accomplished while the central processing unit is writing to the frame buffer rather than requiring a separate step after the pixel data of the original scan lines have been written to the frame buffer. Thus, after the completion of the process, the frame buffer 60 holds a scaled frame in which pixels of the individual scan lines have been interpolated along their lengths and each individual scan line with interpolated pixels has also been replicated in the slow scan direction the necessary number of times to fill the space desired.

With an arrangement using a single frame buffer, this frame may be scanned to the output display. As will be recognized, each of the individual scan lines displayed in this individual frame will provide a linearly varying enlargement of some original scan line of which it is a replication. However, each original scan line and its adjacent duplicate scan lines may cause the frame displayed to exhibit stripes across the output display.

In order to improve the appearance of the frame, the graphics control circuit 17 performs interpolation in the slow scan direction causing modification of the scan lines in the frame buffer. This interpolation may be accomplished by any interpolating circuitry which is a part of the hardware of the graphics control circuit 17. However, in the preferred embodiment, interpolation is accomplished by utilizing a built-in blending circuit 66 of the graphics control circuit 17 to generate interpolated values for pixels. Such a blending circuit 66 essentially calculates a weighted sum of color components for each pixel in an existing scan line that is to be replaced by a new one and for each pixel of another input scan line in the frame buffer and replaces the pixels in the existing scan line by the results of such calculation:

$$N = Beta*E + (1-Beta)*I$$

where E is the color component of the pixel in the existing scan line to be replaced; I is the color component of the pixel in the other input scan line; N is the color component of a new pixel that replaces existing one after blending; and Beta is a blending coefficient (Beta is a non-negative value between 0 and 1).

Comparison of equations (1) and (2) shows that blending produces a correct result for interpolation of the existing scan line with a single input scan line when interpolation occurs in a slow scan direction and the interpolation weights are the same for all pixels of a scan line. The weight of the existing scan line in the interpolated result that replaces it is equal to Beta. Interpolation with more than two scan lines can be accomplished by using multiple blending operations with the same position of existing scan line to be replaced and different input scan lines. Therefore, blending circuitry accomplishes the same task as circuitry specifically designed for interpolation purposes in the case of one dimensional interpolation in the slow scan direction.

Since the blending circuitry is available and is normally used for blending color values between adjacent frames stored in the same frame buffer (such as in combining foreground and background), this interpolation process adds nothing to the physical cost of the system. No additional circuitry is required for practicing the mathematical process of linear interpolation and no additional circuitry is required for storing the scan lines to allow the process to take place.

Rather than interpolating all of the scan lines, the present invention starts first by interpolating those existing scan lines whose pixels have the lowest weight in the weighted sum with other input scan lines and which therefore have to undergo the greatest change during interpolation. Those existing scan lines having higher weights and therefore exhibiting lesser degrees of pixel change are interpolated only if sufficient time remains to accomplish the interpolation operation, given the operating speed of the system and the operating circumstances. In order to estimate if sufficient time remains to continue the process of interpolation, the graphics control circuit 17 utilizes a timer circuit 64 which is used to obtain the time available until a next frame is to be written to the frame buffer 60.

At the beginning of the rendering process for each image, the timer circuit is used to obtain the current time. The process of interpolation in the slow scan direction begins by computation of the contribution of each existing scan line to the new scan line that will replace it. This contribution is equal to the value of the weight W0 for the existing scan line in equation (1). A greater contribution corresponds to a larger value of weight and, generally, to smaller changes in the scan line after interpolation. Such a computation is well known to those skilled in the art and is based on a generic algorithm of linear interpolation (George Wolberg: Digital Image Warping, pp. 58–59, IEEE Computer Society Press, 1992, Los Angeles, Calif.). Next, for each existing scan line to be interpolated, an additional input scan line is selected to be used during the process of interpolation. If there is a choice between identical input scan lines, the scan line with the maximal weight is selected as the input one. The same input scan line can be used for interpolation of one or more existing scan lines. These input scan lines remain in memory and are not altered before interpolation is completed of all existing scan lines which use their data. After the selection of input scan lines, all remaining scan lines are separated into subsets using following rule: all scan lines in each subset have to have their weights in the weighted sums used to compute their replacements within the same predefined limits, while scan lines with weights within the same limits can belong to different subsets. At the first stage of interpolation, all scan lines in one of the subsets with minimal weights are interpolated. Next, the current time is determined using the timer circuit; and the time spent from the beginning of the image rendering is calculated. If this time is less than a time allocated for image rendering, the next subset of scan lines of those remaining to be interpolated having the least weight is interpolated. This process continues until weights of all the remaining scan in the weighted sums used to compute their replacements lines are above or equal to a predefined limit, until only input scan lines are left, or until the time remaining for image processing has expired, whichever comes first. If only input scan lines are left and there is still time for image rendering, the weights of all remaining scan lines in the weighted sums used to compute their replacements are compared with the predefined limit. If there are scan lines with weights below the predefined limit, a new interpolation cycle starts which involves only those scan lines. In this cycle, as in the first one, scan lines are separated into existing scan lines that are to be replaced and input scan lines. A set of input scan lines is selected to be used with multiple existing scan lines to be replaced, and all existing scan lines to be replaced are interpolated in order according to their weights. Cycles of interpolation stop when the weights of all remaining scan lines are above or equal to the predefined limit or when the time allocated for image rendering has expired.

The truncation of the interpolation process based on the time limit for image rendering allows a tradeoff between appearance and speed. For those applications which require the best display quality, the arrangement can be set to allow complete interpolation; while for those applications where speed is important, the circuitry can be set only to process interpolation within the time available. This should be contrasted with systems in which the image generation with interpolation is accomplished in blocks where insufficient time to interpolate causes an incomplete frame. In general, this speeds the operation of the system. Thus, the invention provides a mechanism for compromising between image quality and time required to create images.

Figure 3:
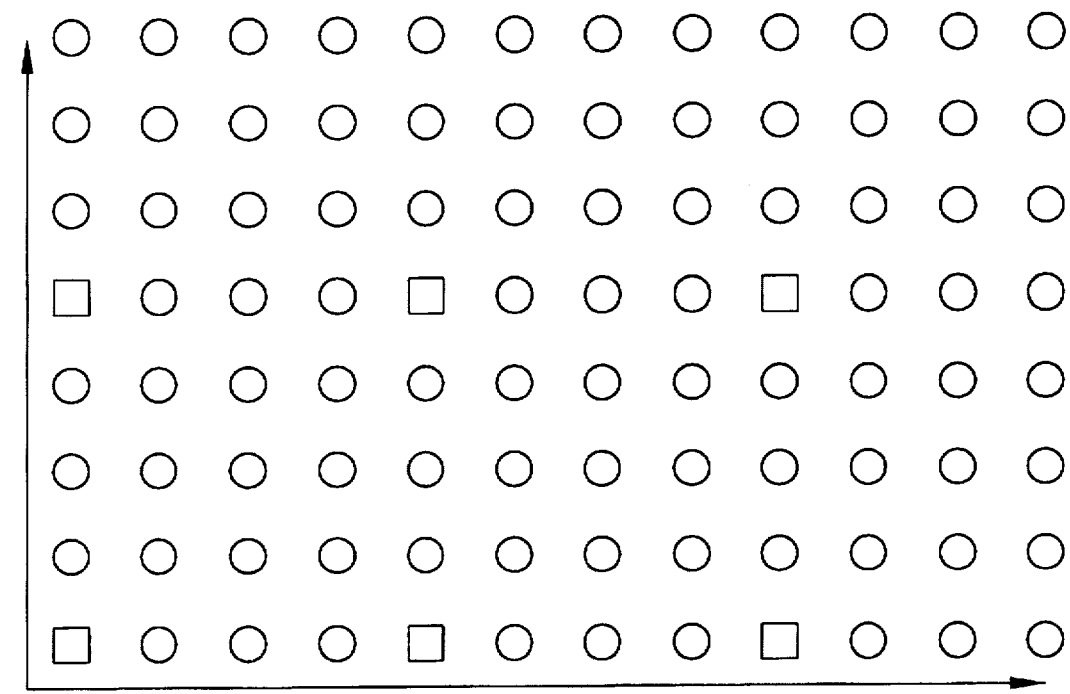
FIG. 3 is a diagram illustrating a first method in accordance with the present invention of presenting scaled images on a computer output display.
Figure 4:
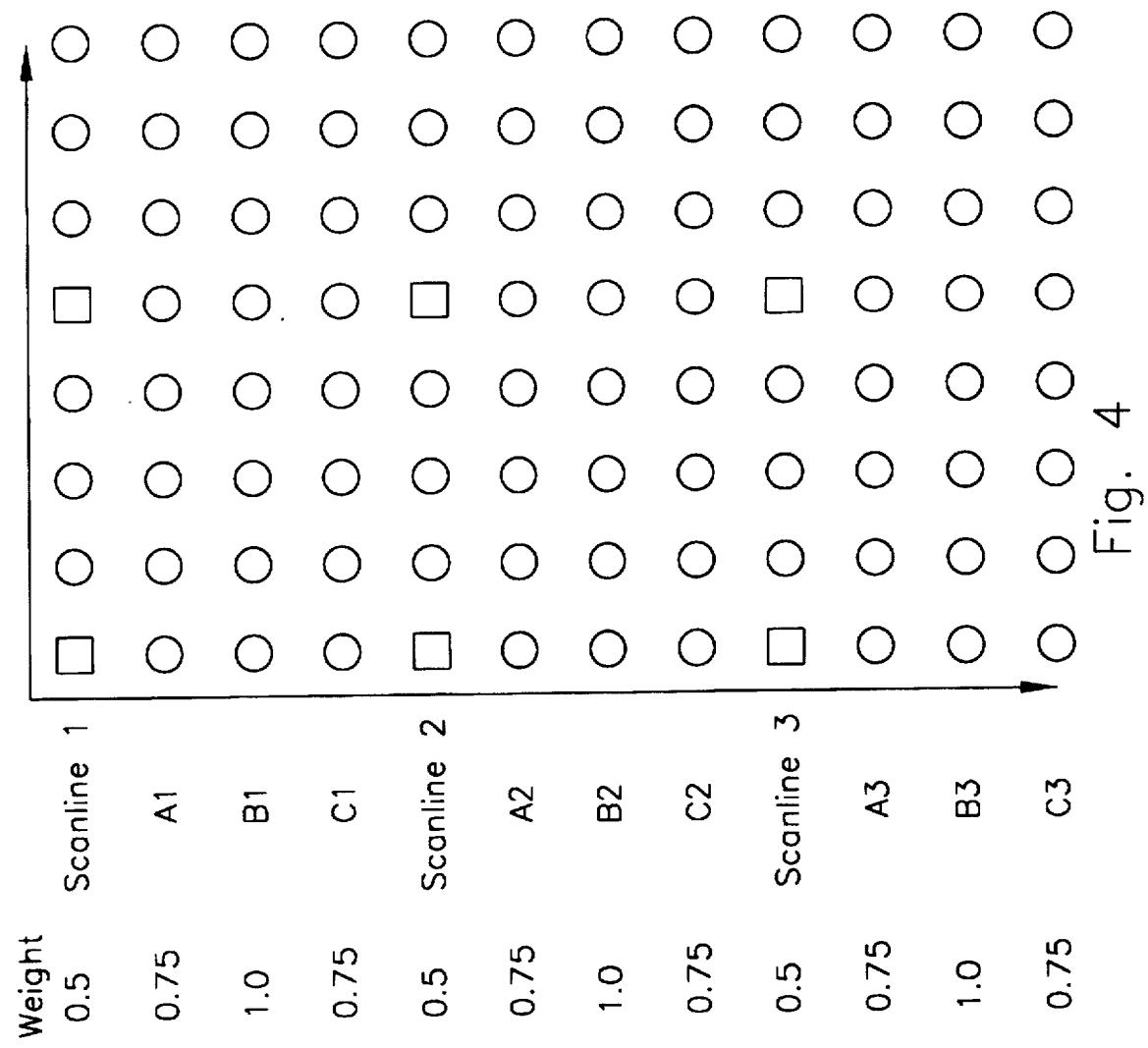
FIG. 4 is a diagram illustrating a second method in accordance with the present invention for presenting scaled images on a computer output display.
Figure 7:
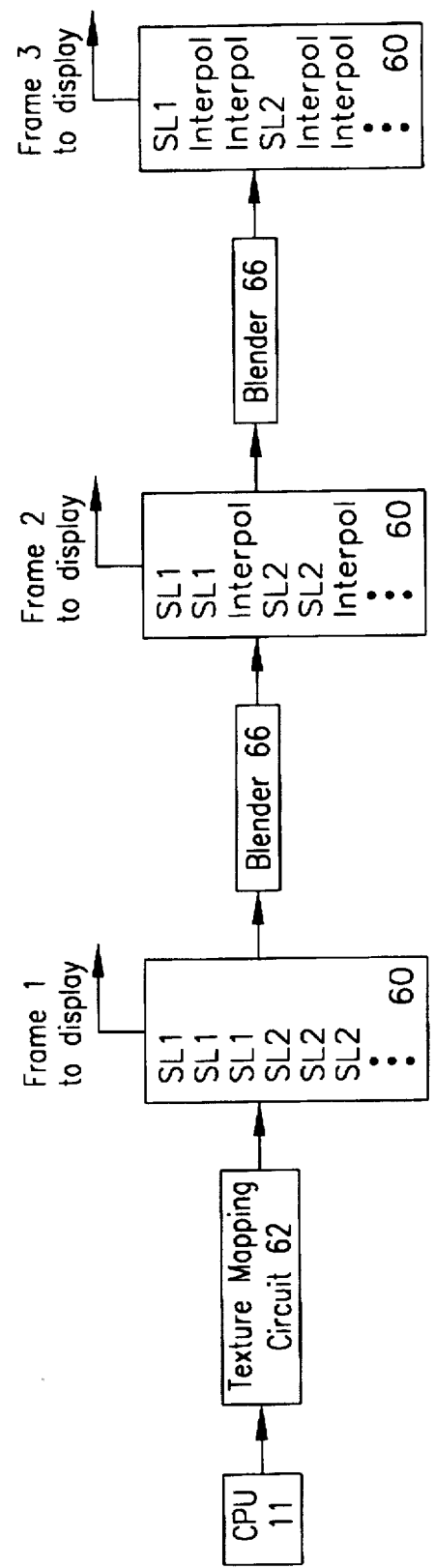
FIG. 7 is a diagram illustrating the flow of operations in practicing the present invention.

Examples of interpolation in the slow scan direction with a scale factor of four (enlarged four times) according to the present invention are illustrated in FIGS. 3, 4, and 5. FIG. 7 shows the process of frame generation related to an example shown in FIG. 4. Scan lines 1, 2, 3, and so on in FIGS. 3 and 4 which include square elements are created by interpolating the scan lines of the original image in a fast scan direction (horizontally). Before interpolation in the slow scan direction (vertically), three scan lines are replicated from each scan line with square elements: for example, scan lines A1, B1, and C1 are replicated from scan line 1; and scan lines A2, B2, and C2 are replicated from scan line 2. The weight of each scan line which represents the contribution of that scan line to the interpolated result of the replacing scan line is shown in FIG. 3 and FIG. 4. Scan lines with maximal weights among sets of identical scan lines are selected as inputs for interpolation of multiple existing scan lines to be replaced. In FIG. 3, such inputs are scan line 1, scan line 2, scan line 3, and succeeding scan lines; in FIG. 4, such inputs are scan line B1, scan line B2, scan line B3, and succeeding scan lines (scan lines with weights 1.0 do not change after interpolation). In this example, existing scan lines may be replaced by a new ones if their weights in the weighted sums are less than 1 (this reference level of weight can be set to any value between 0 and 1). Interpolation equations for images in FIG. 3 and FIG. 4 are shown in FIG. 5. The first component of each equation in the FIG. 5 represents the weighted contribution of the existing scan line that is to be replaced by the result of interpolation; the second component represents the weighted contribution of the input scan line that is also used to calculate the result of interpolation but does not change in memory (e.g., in the frame buffer) after interpolation of the existing scan line. Absence of a second component means that the existing scan line does not change after interpolation (the weight equals 1.0), and therefore does not require additional input to compute a weighted sum.

In the example shown in FIG. 3, subsets of existing scan lines to be interpolated are selected based on the values of their weights only. A single subset is selected for each range of weights. The minimal weight for all scan lines is equal to 0.25. The first subset to be selected includes lines C1, C2, C3, and subsequent scan lines (all having weight 0.25). After the interpolation of these lines, if time remains, a second subset of scan lines (which includes scan lines B1, B2, B3, and subsequent scan lines, all having weight 0.5) is interpolated. If time remains, a third subset is interpolated which includes scan lines A1, A2, A3, and subsequent scan lines (all having weight 0.75). After these interpolation operations, only input scan lines with a weight 1.0 remain so that the process of interpolation is complete. In the example shown in FIG. 4, subsets are selected based on the scan line weights and the number of scan lines per subset. The minimal weight for all scan lines equals 0.5. The first subset of scan lines to be interpolated includes scan lines 1, 2, 3, and subsequent scan lines (all having weight 0.5). As shown in FIG. 7, the first frame to be sent to the screen before interpolation in the slow scan direction contains only sets of identical scan lines produced by replication of scan lines 1, 2, 3, and subsequent scan lines. After the interpolation of the first subset of scan lines, frame 2 in FIG. 7 is sent to the display; twenty-five percent of scan lines in this frame have been interpolated. If time remains, a second subset of scan lines is interpolated which includes scan lines A1, A2, A3, and subsequent scan lines (all having weight 0.75) and frame 3 in FIG. 7 with fifty percent of the scan lines interpolated is sent to the display. Next, if time remains, a third subset of scan lines is interpolated which includes scan lines C1, C2, C3, and subsequent scan lines (all having weight 0.75) and frame 4 is sent to display (not shown in FIG. 7). The remaining scan lines with weight 1.0 do not need to be interpolated so the process of interpolation is completed after seventy-five percent of all scan lines in the image have been interpolated. To the eye of the viewer, consecutive frames 1–4 will blend together providing a picture in which the blockiness and stripes of the original replicated scan lines will have disappeared.

FIG. 4 illustrates an example where the second and third subsets each have identical weights. They are processed separately in order to allot smaller time segments to each interpolation and provide the ability to stop the interpolation process earlier if the time allocated for image rendering is expiring.

It should be noted that the two different sets of weights for existing scan lines to be replaced and numbers of input scan lines used in the examples in FIG. 3 and FIG. 4 produce the same interpolated images. The only difference is that the image interpolated with the weights and inputs illustrated in FIGS. 3 and 5 is shifted two scan lines up relative to the image interpolated with the weights and inputs shown in FIGS. 4 and 5. If the image stored in the frame buffer is visible before interpolation in a slow scan direction, interpolation accordingly to FIG. 3 produces a perceivable shift upward of two scan lines, while a shift after interpolation as shown in FIG. 4 is less than one scan line and, in most cases, is not apparent to the viewer. Therefore, the weights and input numbers presented in FIGS. 4 and 5 are more suitable for interpolation in the visible buffer. In a case of double-buffering where the image becomes visible only after completion of rendering, the weights and input numbers presented in FIGS. 3 and 5 can be used as well. If visible buffer interpolation in FIG. 4 is stopped at any intermediate point, the resulting image remains complete; only the image quality changes during the slow scan interpolation process.

The weights shown in FIGS. 3 and 4 are calculated for linear interpolation and produce images without visible block edges but having relatively low contrast. To provide images of higher contrast, weights other than those presented in FIGS. 3 and 4 can be used. For instance, if lines A1, C1, A2, C2, A3, C3, and subsequent scan lines in FIG. 4 are assigned weights 0.9 instead of 0.75, the resulting image has a higher contrast but some edges between the scan lines C1 and 2, C2 and 3, and subsequent scan lines become visible. Research shows that adjustable compromise between replication artifacts and image contrast is achievable for a wide variety of weights deviating from those corresponding to a precise linear interpolation algorithm. Therefore, the method described in the present invention can produce images of adjustable contrast by adjusting pre-computed values of weights associated with each scan line to be replaced. It will be noted that the present invention may be utilized with many different variations of the interpolation process. Thus, criteria other than the weight of the existing scan line in the weighted sum that is used to compute its replacement may be used to determine which of the scan lines in the frame buffer are to be first interpolated. For example, in the case of an image with large blocks of solid color which do not change after interpolation, only scan lines outside those areas have to be interpolated. Moreover, any number of different algorithms may be utilized to generate the interpolated lines because in each case the frame buffer itself provides the necessary storage for the input scan lines. Although the preferred embodiment of the invention carries out the interpolation operation using the blending circuitry, other arrangements for accomplishing this may also make use of the present invention.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method of scaling images in a digital display system having a central processing unit, and a graphics control circuit including a frame buffer, comprising the steps of:

interpolating the pixels of each scan line of pixels to a selected scale using the central processing unit as the scan line is written, replicating in the slow scan direction each interpolated scan line being sent to the frame buffer to a selected scale using circuitry of the graphics control circuit, interpolating scan lines in the slow scan direction utilizing selected scan lines stored in the frame buffer as input scan lines, and replacing existing scan lines which have been selected for interpolation with the interpolated scan lines.

2. A method of scaling images as claimed in claim 1 in which the step of interpolating scan lines uses a blending circuit to interpolate scan lines.

3. A method of scaling images as claimed in claim 1 in which the steps of interpolating scan lines and replacing scan lines continue for as long as time remains before a next frame is to be written to the frame buffer.

4. A method of scaling images as claimed in claim 3 in which the time remaining before a next frame is to be written to the frame buffer is computed using a timing circuit in the graphics control circuit.

5. A method of scaling images as claimed in claim 4 in which the steps of interpolating scan lines and replacing scan lines use blending circuitry of the graphics control circuit.

6. A method of scaling images in a digital display system having a central processing unit, and a graphics control circuit including a frame buffer, comprising the steps of:

interpolating the pixels of each scan line of pixels to a selected scale using the central processing unit as the scan line is written, replicating each interpolated scan line being sent to the frame buffer to a selected scale using circuitry of the graphics control circuit, selectively interpolating scan lines utilizing scan lines stored in the frame buffer as input scan lines, the step beginning by interpolating scan lines containing pixel data which contributes least to replacing scan lines, and proceeding by interpolating scan lines in an increasing order of contribution to replacing scan lines, the step of selectively interpolating scan lines uses a blending circuit to interpolate scan lines, and replacing existing scan lines which have been selected for interpolation with the interpolated scan lines.

7. A method of processing a digital input image having a plurality of original scan lines of pixel data into an interpolated digital output image comprising the steps of:

interpolating the pixel data in each original scan line of the digital input image to provide from each original scan line a plurality of identical scan lines interpolated in a fast scan direction, storing the interpolated scan lines, calculating a value of weight of each existing stored scan line that may be replaced by a scan line interpolated in a slow scan direction, the weight representing a contribution of an existing scan line to be used in the weighted sum with other scan lines to compute a replacement for the existing scan line, selecting groups of existing scan lines from storage to produce interpolated scan lines in the slow scan direction of the interpolated output image, creating an interpolated scan line for each existing scan line in a selected group as a weighted sum of the existing scan line with another scan line, and writing each interpolated scan line created in place of an existing scan line from each of the groups.

8. A method of processing a digital input image as claimed in claim 7 in which the step of selecting groups of existing scan lines from storage to produce interpolated scan lines is based on the weight of each existing scan line in the weighted sum of scan lines which are used to compute replacement of the existing scan line.

9. A method of processing a digital input image as claimed in claim 7 in which the steps of selecting groups of existing scan lines, creating an interpolated scan line, and writing each interpolated scan line created in place of an existing scan line are repeated until a predefined time limit is exceeded for image processing.

10. A method of processing a digital input image as claimed in claim 7 in which the steps of selecting groups of existing scan lines, creating an interpolated scan line, and writing each interpolated scan line created in place of an existing scan line are based on image quality and a degree of change from original values of the pixels of existing scan lines selected by the user.

11. A method of processing a digital input image as claimed in claim 7 in which the step of storing the interpolated scan lines is accomplished utilizing a frame buffer.

12. A method of processing a digital input image as claimed in claim 7 in which the step of creating an interpolated scan line is accomplished utilizing blending circuitry.

13. A method of processing a digital input image having a plurality of original scan lines of pixel data into an interpolated digital output image comprising the steps of:

interpolating the pixel data in each original scan line of the digital input image to provide from each original scan line a plurality of identical scan lines interpolated in a fast scan direction, storing the interpolated scan lines, calculating a value of weight of each existing stored scan line that may be replaced by a scan line interpolated in a slow scan direction, the weight representing a contribution of an existing scan line to be used in the weighted sum with other scan lines to compute a replacement for the existing scan line, selecting groups of existing scan lines from storage to produce interpolated scan lines in the slow scan direction of the interpolated output image, the step of selecting groups of existing scan lines from storage to produce interpolated scan lines being based on the weight of each existing scan line in the weighted sum of scan lines which are used to compute replacement of the existing scan line, creating an interpolated scan line for each existing scan line in a selected group as a weighted sum of the existing scan line with another scan line, and writing each interpolated scan line created in place of an existing scan line from each of the groups, in which the steps of selecting groups of existing scan lines, creating an interpolated scan line, and writing each interpolated scan line created in place of an existing scan line are repeated in ascending order of weights of existing scan lines in a weighted sum used to compute replacements, starting with groups of scan lines having lowest weights.

14. A method of processing a digital input image as claimed in claim 13 in which the steps of selecting groups of existing scan lines, creating an interpolated scan line, and writing each interpolated scan line created in place of an existing scan line are repeated until only existing scan lines with weights equal or larger than a predefined value are left uninterpolated or a predefined time limit is exceeded for image processing, whichever event occurs first.

15. A method of processing a digital input image having a plurality of original scan lines of pixel data into an interpolated digital output image comprising the steps of:

interpolating the pixel data in each original scan line of the digital input image to provide from each original scan line a plurality of identical scan lines interpolated in a fast scan direction, storing the interpolated scan lines, calculating a value of weight of each existing stored scan line that may be replaced by a scan line interpolated in a slow scan direction, the weight representing a contribution of an existing scan line to be used in the weighted sum with other scan lines to compute a replacement for the existing scan line, selecting groups of existing scan lines from storage to produce interpolated scan lines in the slow scan direction of the interpolated output image, creating an interpolated scan line for each existing scan line in a selected group as a weighted sum of the existing scan line with another scan line, and writing each interpolated scan line created in place of an existing scan line from each of the groups, in which the steps of selecting groups of existing scan lines, creating an interpolated scan line, and writing each interpolated scan line created in place of an existing scan line proceed through a gradually decreasing range of scan lines providing the greatest change with respect to original values of pixels in existing scan lines so long as image processing time remains.

16. A method of processing a digital input image as claimed in claim 15 which comprises the further steps of:

obtaining a time at the end of processing each range of scan lines, comparing time remaining for image processing with a predefined time, and stopping processing if insufficient time remains to process scan lines in a next range.

17. Apparatus for scaling a digital input image in a digital display system comprising:

pixel data interpolation circuitry to provide a plurality of scan lines interpolated in a fast scan direction from each scan line of a digital input image, replicating circuitry to copy the pixels of each interpolated scan line to provide additional scan lines in the slow scan direction, means for calculating slow scan direction interpolation coefficients for scan lines to be interpolated in the interpolated output image, a memory array for storing a digital image including the interpolated and replicated scan lines, and circuitry to interpolate selected scan lines which have been stored in the memory array using selected existing scan lines to produce interpolated scan lines in the slow scan direction of the interpolated output image.

18. Apparatus for scaling a digital input image in a digital display system as claimed in claim 17 in which the circuitry to interpolate selected scan lines comprises blender circuitry.

19. Apparatus for scaling a digital input image in a digital display system as claimed in claim 17 in which the replicating circuitry to copy the pixels of each interpolated scan line to provide additional scan lines in the slow scan direction comprises replication circuitry associated with the memory array.

20. Apparatus for scaling a digital input image in a digital display system as claimed in claim 17 in which the replicating circuitry to copy the pixels of each interpolated scan line to provide additional scan lines in the slow scan direction comprises texture mapping circuitry associated with the memory array.

21. Apparatus for scaling a digital input image in a digital display system as claimed in claim 17 in which the memory array for storing a digital image is a frame buffer.

* * * * *

UNITED STATES PATENT AND TRADEMARK OFFICE
CERTIFICATE OF CORRECTION

| | | |
|---|---|---|
| PATENT NO. | : 5,793,379 | Page 1 of 1 |
| APPLICATION NO. | : 08/921425 | |
| DATED | : August 11, 1998 | |
| INVENTOR(S) | : Eugene Lapidous | |

It is certified that error appears in the above-identified patent and that said Letters Patent is hereby corrected as shown below:

TITLE PAGE IN THE "RELATED U.S. APPLICATION DATA" at (63):

In Line 1, delete "Apr. 30, 1995" and replace with "Apr. 3, 1995".

Signed and Sealed this

Seventh Day of September, 2010

David J. Kappos
*Director of the United States Patent and Trademark Office*